(12) United States Patent
Trent, Jr. et al.

(10) Patent No.: US 9,134,843 B2
(45) Date of Patent: Sep. 15, 2015

(54) SYSTEM AND METHOD FOR DISTINGUISHING INPUT OBJECTS

(75) Inventors: Raymond Alexander Trent, Jr., San Jose, CA (US); Carmen Palsan, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 813 days.

(21) Appl. No.: 12/827,983

(22) Filed: Jun. 30, 2010

(65) Prior Publication Data
US 2012/0001855 A1 Jan. 5, 2012

(51) Int. Cl.
*G06F 3/041* (2006.01)

(52) U.S. Cl.
CPC ............ *G06F 3/0416* (2013.01); *G06F 3/0418* (2013.01); *G06F 2203/04104* (2013.01)

(58) Field of Classification Search
CPC ................... G06F 2203/04808; G06F 3/0485; G06F 3/04883; G06F 3/0416; G06F 3/0418
USPC ......................................................... 345/173
See application file for complete search history.

(56) References Cited

U.S. PATENT DOCUMENTS

| | | | | |
|---|---|---|---|---|
| 2007/0091070 A1* | 4/2007 | Larsen et al. | ................. | 345/168 |
| 2008/0165160 A1* | 7/2008 | Kocienda et al. | ............. | 345/175 |
| 2008/0309626 A1* | 12/2008 | Westerman et al. | .......... | 345/173 |
| 2008/0316183 A1* | 12/2008 | Westerman et al. | .......... | 345/173 |
| 2009/0174675 A1 | 7/2009 | Gillespie et al. | | |
| 2009/0207140 A1* | 8/2009 | Hansson | ....................... | 345/173 |

FOREIGN PATENT DOCUMENTS

| | | |
|---|---|---|
| JP | 2006106844 A | 4/2006 |
| KR | 20070106280 A | 11/2007 |
| KR | 20100002849 A | 1/2010 |

OTHER PUBLICATIONS

International Bureau, International Preliminary Report on Patentability dated Jan. 17, 2013 for International Application No. PCT/US2011/041853.
Patent Cooperation Treaty, "International Search Report" mailed Jan. 19, 2012; International Appln. No. PCT/US2011/X041853, filed Jun. 24, 2011.

* cited by examiner

*Primary Examiner* — Quan-Zhen Wang
*Assistant Examiner* — Xuemei Zheng
(74) *Attorney, Agent, or Firm* — Osha Liang LLP

(57) ABSTRACT

The embodiments described herein provide devices and methods that facilitate improved sensor device usability. Specifically, the devices and methods provide the ability to determine more reliably that sensed object positions correspond to a single input object or multiple input objects. For example, the devices and methods may be used to determine if a first sensed object position and a second sensed object position correspond to a single input object. The determination of a single input object or multiple input objects may be used to facilitate the reliable activation of user interface actions, such as cursor control and the use of virtual button zones, and thus can improve sensor device usability.

19 Claims, 6 Drawing Sheets

SYSTEM AND METHOD FOR DISTINGUISHING INPUT OBJECTS

FIELD OF THE INVENTION

This invention generally relates to electronic devices, and more specifically relates to input devices and using input devices for producing user interface inputs.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the input device determines the presence, location and/or motion of one or more input objects. Proximity sensor device may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). Increasingly, proximity sensor devices are used in media systems, such as CD, DVD, MP3, video or other media recorders or players.

In the past, some proximity sensor devices have had limited ability to distinguish between the actions of a single input object and the actions of multiple input objects in the sensing region. For example, some past proximity sensor devices have had difficulty in determining that a user has lifted one finger from the sensing region, and placed down a second finger shortly thereafter. In such cases, the proximity sensor device may instead incorrectly determine that the sensed object positions reflect the movement of a single input object across the sensing region. In other cases, the proximity sensor device may incorrectly determine a user has lifted one finger and placed a second, when in fact the user has simply moved the same finger rapidly across the sensing region. In either case, the proximity sensor device may initiate an undesirable user interface action in response to the incorrect determination.

For example, some proximity sensor devices may have specially defined portions of the sensing region that provide specific interface functions. In some implementations these portions of the sensing region may be considered to be a "virtual button", where a user "tapping" on the virtual button initiates the specified function. In such cases the virtual button region may also be used for other user interface actions. To give one specific example, during a cursor control operation, a user moving an object across the sensing region may cause cursor movement. When the object moves into the button region the sensor device should interpret that as continued object motion, and the sensor device should cause continued cursor motion in response. However, if the sensor device were to instead interpret the presence in the virtual button zone as the user now "tapping" the virtual button, the sensor device would incorrectly cease cursor control and activate the corresponding button function instead. Conversely, a user tapping on the virtual button shortly after having moved another object across the sensing region could be incorrectly interpreted by the device as continued object motion across the sensing region. In this case, the sensor device would incorrectly cause cursor motion instead of activating the button function.

In each case, unintended actions are generated and the user of the sensor device is likely to be inconvenienced and annoyed. For example, such results may cause the cursor to jump when it is intended to be stationary, requiring the user to reposition the cursor before tapping the virtual button again.

Thus, what is needed are improved techniques for more reliably determining if sensed object positions correspond to a single object or multiple objects in a sensing region of a proximity sensor device. Other desirable features and characteristics will become apparent from the subsequent detailed description and the appended claims, taken in conjunction with the accompanying drawings and the foregoing technical field and background.

BRIEF SUMMARY OF THE INVENTION

The embodiments of the present invention provide devices and methods that facilitate improved sensor device usability. Specifically, the devices and methods provide the ability to determine more reliably that sensed object positions correspond to a single input object or multiple input objects. For example, the devices and methods may be used to determine if a first sensed object position and a second sensed object position correspond to a single input object. The determination of a single input object or multiple input objects may be used to facilitate the reliable activation of user interface actions, such as cursor control and the use of virtual button zones, and thus can improve sensor device usability.

In one embodiment, an input device comprises an array of sensing electrodes and a processing system coupled to the electrodes. The sensing electrodes are configured to sense objects in the sensing region. The processing system is configured to determine a first distance between a first object position and a second object position, and to determine a second distance between the second object position and the third object position. The processing system is further configured to determine if the first object position and the second object position both correspond to a single input object from the first distance and the second distance. Thus, the input device facilitates the determination that sensed object positions correspond to the same or different objects, and this determination may be used to facilitate the reliable indication of correct user interface actions.

In other embodiments, a method and processing system are provided to facilitate the determination that sensed object positions correspond to a single input object or multiple input objects. In these embodiments, the method and processing system are configured to determine a first distance between a first object position of a user input and a second object position, determine a second distance between the second object position and a third object position, and determine if the first object position and the second object position correspond to a single input object using the first distance and the second distance. A control signal is generated in response to determining that the first input object position and the second input object position both correspond to the single input object. Thus, the method and processing system facilitates the determination that sensed object positions correspond to the same or different objects, and this determination may be used to facilitate the reliable indication of correct user interface actions

BRIEF DESCRIPTION OF DRAWINGS

The preferred exemplary embodiment of the present invention will hereinafter be described in conjunction with the appended drawings, where like designations denote like elements, and wherein.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The embodiments of the present invention provide devices and methods that facilitate improved sensor device usability. Specifically, the devices and methods provide the ability to determine more reliably that sensed object positions correspond to either a single input object or multiple input objects. For example, the devices and methods may be used to determine if a first sensed object position and a second sensed object position both correspond to a single input object. The determination that sensed positions correspond to a single input object or multiple input objects may be used to facilitate the reliable selective activation of user interface actions. For example, the determination may be used to distinguish between desired interface actions such as cursor control and the activation of special functions associated with virtual button zones. Because such a determination can make for more consistent response it can significantly improve sensor device usability.

In one embodiment, an input device comprises an array of sensing electrodes and a processing system coupled to the electrodes. The sensing electrodes are configured to sense objects in the sensing region. For example, the sensing electrodes may be configured to use changes in measured capacitance to sense objects. The processing system is configured to determine positional information of such objects in the sensing region using measurements obtained with the sensing electrodes. The processing system is configured to, using such positional information, determine a first distance between a first object position and a second object position and determine a second distance between the second object position and the third object position. The processing system is further configured to determine if the first object position and the second object position both correspond to a single input object from the first distance and the second distance. Thus, the input device facilitates the determination that sensed object positions correspond to the same or different objects, and this determination may be used to facilitate the reliable indication of correct user interface actions.

Figure 1:
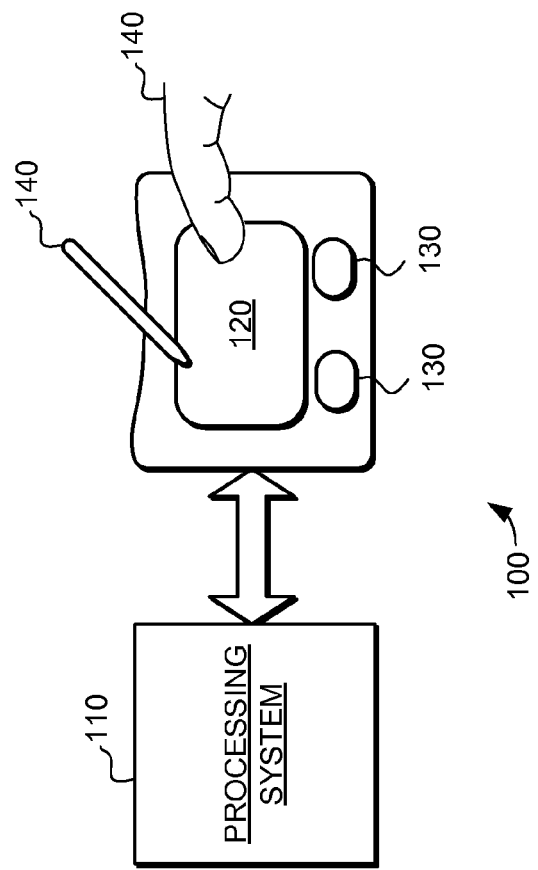
FIG. 1 is a block diagram of an exemplary system that includes an input device in accordance with an embodiment of the invention.

Turning now to the figures, FIG. 1 is a block diagram of an exemplary input device 100, in accordance with embodiments of the invention. The input device 100 may be configured to provide input to an electronic system (not shown). As used in this document, "electronic system" (or "electronic device") broadly refers to any system capable of electronically processing information. As a non-limiting example, the electronic system may comprise a composite input device, such as a physical keyboard that includes the input device 100 and separate key switches. Additional exemplary electronic systems include peripherals such as data input devices (including remote controls and mice), and data output devices (including display screens and printers). Other examples include workstations or remote terminals, desktop computers, laptop computers, net books, tablets, personal digital assistants, and video game machines. Further examples include communication devices such as wireless phones, pagers, and other messaging devices. Even further examples include media devices that record, edit, or play various forms of media, such as televisions, cable boxes, video players, music players, digital photo frames, digital cameras, sound recorders, and video cameras. Additionally, the electronic system could be a host or a slave to the input device.

The input device 100 may be implemented as a physical part of the electronic system, or be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a touchpad or a touch sensor device) configured to sense input provided by one or more input objects 140 in a sensing region 120. Example input objects 140 include fingers and styli, as shown in FIG. 1.

Sensing region 120 encompasses any space above, around, in and/or near the input device 100 in which sensing elements of the input device 100 are able to detect user input (e.g., provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that involves no contact with any surfaces of the input device 100, contact with an input surface (e.g., a touch surface) of the input device 100, contact with an input surface of the input device 100 coupled with some amount of applied force or pressure, and/or a combination thereof. In some embodiments, the sensing region 120 has a rectangular shape when projected onto an input surface of the input device 100.

The sensing elements of the input device 100 may utilize any combination of suitable sensor components and sensing technologies to detect user input in the sensing region 120. As several non-limiting examples, the input device 100 may use capacitive, elastive, resistive, inductive, surface acoustic wave, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other patterns of capacitive sensor electrodes to create electric fields. Some capacitive implementations utilize resistive sheets which may be uniformly resistive.

Some capacitive implementations utilize "self capacitance" (or "absolute capacitance") sensing methods based on changes caused by input in the capacitive coupling between sensor electrodes and free space. In one implementation, an absolute capacitance sensing method operates by modulating sensor electrodes with respect to a reference voltage (e.g. system ground) and detecting the capacitive coupling between the sensor electrodes and input objects.

Some capacitive implementations utilize "mutual capacitance" (or "transcapacitance") sensing methods based on the capacitive coupling between sensor electrodes. In one implementation, a transcapacitive sensing method operates by detecting changes caused by input in the capacitive coupling between one or more transmitting electrodes and one or more receiving electrodes. Transmitting sensor electrodes may be substantially modulated relative to a reference voltage (e.g. system ground) to facilitate transmission, and receiving sensor electrodes may be held substantially constant relative to the reference voltage to facilitate receipt. Sensor electrodes may be dedicated transmitters or receivers, or may transmit as well as receive.

In FIG. 1, a processing system (or "processor") 110 is shown as part of the input device 100. The processing system 110 is configured to operate the hardware of the input device 100 to detect input in the sensing region 120. The processing system 110 comprises parts of or all of one or more integrated circuits (ICs), and in some embodiments, the processing system also comprises firmware code, software code, or both. In some embodiments, components comprising the processing system 110 are located together, such as near sensing elements of the input device 100. In other embodiments, components of processing system 110 are physically separated, with one or more components close to sensing elements of input device 100, and one or more components elsewhere. For example, the input device 100 may be peripheral to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information.

In some embodiments, the processing system 110 responds to user input (or lack of user input) in the sensing region 120 directly by causing actions. Exemplary actions include changing operation modes, as well as graphical user interface (GUI) actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions, as listed above.

For example, in some embodiments, the processing system 110 operates the sensing elements of the input device 100 to produce electrical signals indicative of input (or lack of input) in the sensing region 120. The processing system 110 may perform any appropriate amount of processing on the electrical signals in producing the information provided to the electronic system. For example, the processing system 110 may merely digitize the electrical signals. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine "positional information," recognize inputs as commands, recognize handwriting, and the like.

"Positional information" as used herein broadly encompasses absolute position, relative position, velocity, acceleration, and other types of spatial information. Various forms of positional information may also include time history components, as in the case of tracking motion over time. Exemplary "zero-dimensional" positional information includes near/far or contact/no contact information. Exemplary "one-dimensional" positional information includes positions along an axis. Exemplary "two-dimensional" positional information includes motions relative to a plane. Exemplary "three-dimensional" positional information includes velocities in space. Other examples include other dimensions and other representations of spatial information.

In some embodiments, the input device 100 is implemented with additional input components that are operated by the processing system 110 or by some other processing system. These additional input components may provide redundant functionality for input in the sensing region 120, or to provide some other functionality. The embodiment shown in FIG. 1 includes buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen, and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are to be described herein the context of a fully functioning apparatus, the mechanisms of the present invention are capable of being distributed as a program product in a variety of forms. For example, the mechanisms of the present invention may be implemented and distributed as a sensor program on media that is computer-readable, computer-recordable, or both. Additionally, the embodiments of the present invention apply equally regardless of the particular type of computer-readable medium used to carry out the distribution. Examples of computer-readable and computer-recordable media include various discs, memory sticks, memory cards, memory modules, and the like. Computer-readable and computer-recordable media may be based on flash, optical, magnetic, holographic, or any other storage technology.

In other embodiments, the mechanisms of the present invention may be implemented as a processing system including one or more modules. For example, some embodiments may comprise a position acquisition module that is configured to acquire object positions of input objects in the sensing region 120.

Some embodiments may additionally comprise a determiner module configured to process the positions acquired by the position acquisition module. For example, the determiner module may determine a first distance between a first object position acquired by the position acquisition module and a second object position acquired by the position acquisition module, determine a second distance between the second object position and a third object position acquired by the position acquisition module, and determine if the first object position and the second object position both correspond to a single input object using the first distance and the second distance.

In some embodiments, the determiner module determines if a distance is greater (or less than) a threshold. The determiner module may make this determination in any appropriate way, including comparing a straight-line distance between positions or by comparing components. For example, a determiner may determine whether a distance has a component in a first axis greater (or less than) than a first threshold, and a component in a second axis greater (or less than) a second threshold. Using two dimensional Cartesian coordinates, the components may be the X and Y components, for example.

In some embodiments, the determiner module determines a time associated with various positions. This time may be a when an object position was detected, a duration between positions, or any appropriate time determination. The time determination may comprise actual time or an analog to time units. For example, where the sampling rate is known or can be estimated, an analog to time units for expressing the duration between different positions may be how many samples were taken between the different positions.

In some embodiments, the determiner module determines a speed associated with various positions. This may be an instantaneous speed at an object position, an average speed between object positions, or any appropriate speed determination. The speed determination may comprise actual speed or an analog to speed. For example, where the sampling rate is known or can be estimated, an analog to average speed between samples may be the distance traveled between samples.

Some embodiments may also comprise a reporter module configured to report a control signal, such as to a host processor or to an associated electronic device. In various embodiments, the reporter module may report a control signal in response to a determination that two object positions both correspond to a single input object, both do not correspond to a single input object, or both (perhaps with different control signals for correspondence and lack of correspondence). In some embodiments, the reporter module may delay a motion control signal in response to at least one of an acquisition of the second object position and a determination of the first distance, and report the motion control signal in response to a determination that the first object position and the second object position both correspond to the single input object. In such embodiments, the reporter module may not report the motion control signal in response to a determination that the first object position and the second object position do not both correspond to the single input object.

In accordance with the embodiments of the invention, the input device 100 is implemented to facilitate improved input device usability. Specifically, the input device 100 is implemented to facilitate the reliable determination that sensed object positions correspond to either a single input object or multiple input objects. In one embodiment, the input device 100, and in particular the processing system 110, is configured to determine a first distance between a first object position and a second object position, and to determine a second distance between the second object position and the third object position. From these distances, the input device 100 is configured to determine if the first object position and the second object position both correspond to a single input object from the first distance and the second distance. Thus, the input device 100 facilitates the determination that sensed object positions correspond to the same or different objects, and this the determination may be used to facilitate the reliable indication of correct user interface actions.

Figure 2:
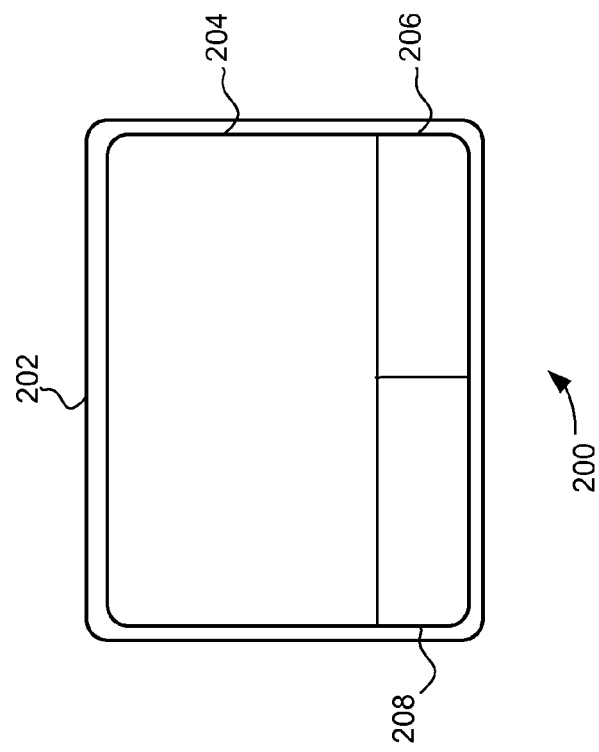
FIG. 2 is a schematic view of an input device with a sensing region in accordance with an embodiment of the invention.

Turning now to FIG. 2, an exemplary input device 200 is illustrated. The input device 200 is configured to sense objects in a sensing region 202. In this embodiment, sensing region 202 includes a main portion 204 and two auxiliary portions 206 and 208. Such portions may be used to provide a variety of user interface functionality. For example, the auxiliary portions 206 and 208 may be used to provide "virtual button" functionality. In such a system the virtual buttons may be used to activate specific selected functions. For example, by allowing a user to selectively "tap" the auxiliary portions 206 and 208 to cause specified functions to occur.

It should be noted that in some embodiments these auxiliary portions 206 and 208 may provide the same functionality as does main portion 204, may provide support for other interface functions, or both (e.g. which functions being selected based on time, state, context, etc.). For example, the entire sensing region 202 may be used for interface actions such a scrolling or cursor control. In such operations, a user may move input objects in and out of the auxiliary portions 206 and 208. Naturally, it is highly desirable that such an input device 200 be able to determine more reliably the intent of the user in placing objects in the sensing region 202, and in particular in the auxiliary portions 206 and 208. Specifically, it is desirable that the input device 200 be able to determine if the user intended continuation of whatever action was being performed by moving an input object across the sensing region, and that such movement may have just happened to enter the auxiliary portion 206. Likewise, it is desirable that the input device 200 be able to determine if the user instead intended to cease the previous action by lifting the input object from the sensing region 202 and initiate a function associated with the auxiliary region 206 by placing a different object in the auxiliary region 206. When input objects are sensed both in and out of the auxiliary portions in rapid succession, such a determination may be particular problematic.

Figure 3:
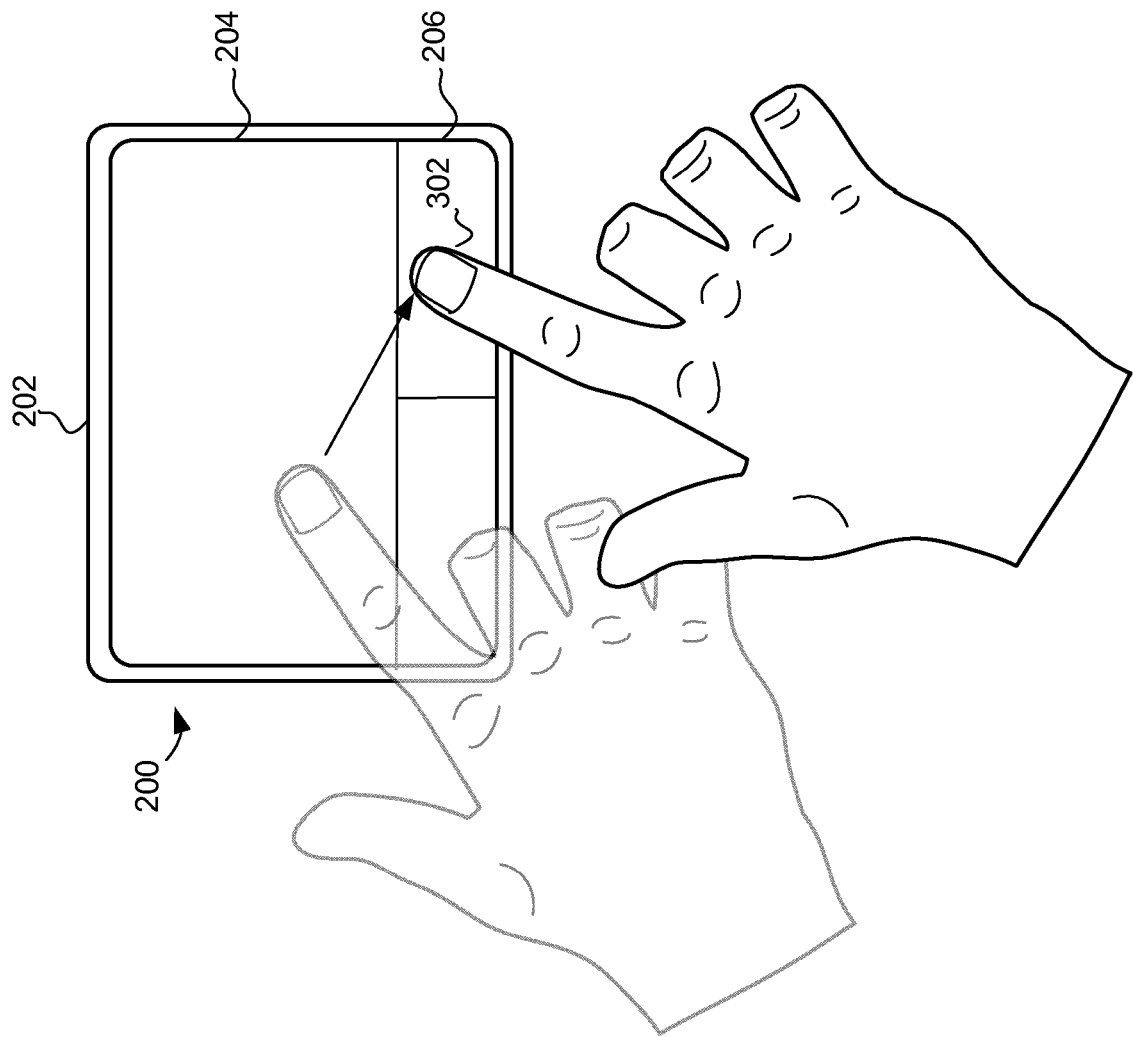
FIG. 3 is a top view of an input device with one object in the sensing region in accordance with an embodiment of the invention.
Figure 4:
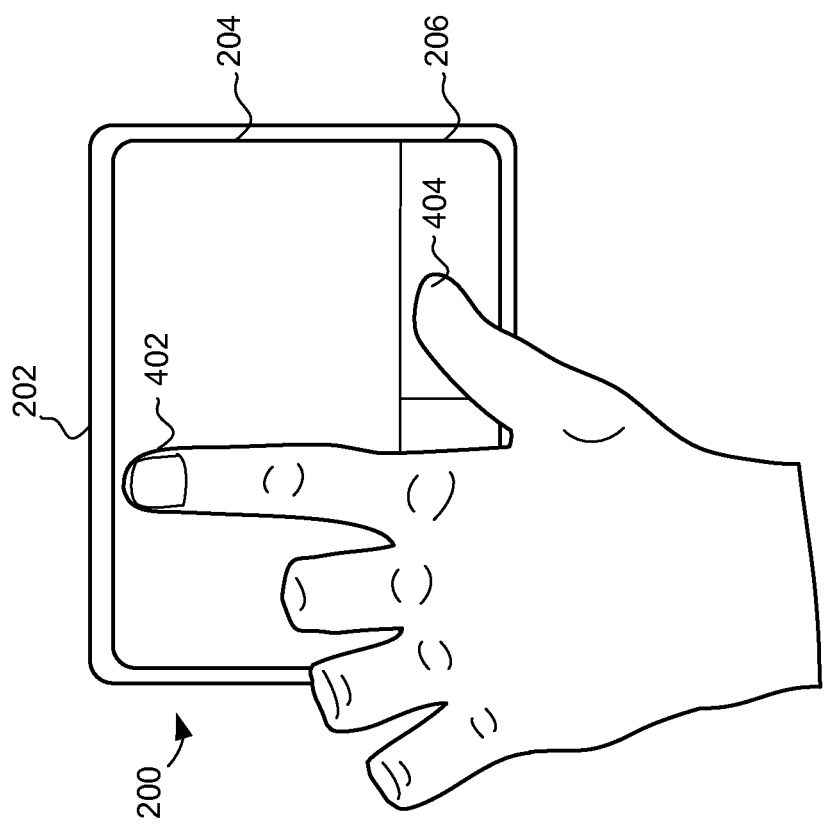
FIG. 4 is a top view of an input device with two objects in the sensing region in accordance with an embodiment of the invention.

Turning now to FIGS. 3 and 4, the input device 200 is illustrated with two different exemplary input object scenarios. In FIG. 3, an input object (i.e., a finger 302) is illustrated moving from main portion 204 of the sensing region to the auxiliary portion 206. In FIG. 4, two input objects (i.e., finger 402 and finger 404) are shown, where finger 402 is being lifted from the main portion 204 of the sensing region and finger 404 is being placed in the auxiliary portion 206.

It should be appreciated that when either scenario occurs within a sufficiently short time period, the input device 200 will effectively detect an input object in the main portion 204 and then detect an input object in the auxiliary portion 206. The input device 200 thus may not be able to distinguish between the scenario illustrated in FIG. 3 where both object positions correspond to the same input object (i.e., finger 302) and the scenario illustrated in FIG. 4 where the two object positions correspond to two different input objects (i.e., fingers 402 and 404). Without such a reliable determination, the input device 200 will be unable to reliably generate the appropriate response, e.g., continue with additional cursor motion or activate the function associated with the auxiliary portion 206.

This can lead to several different problems. For example, the cursor may be moved when the user was expecting the action associated with the auxiliary portion 206. Such unwanted movement may move the cursor off the user's intended target, causing the user to have to reposition the cursor and attempt to activate the button press again. Similarly, the inadvertent activation of a function associated with a button press may cause a host of unwanted actions to occur while interfering with the desired cursor motion.

Embodiments of the present invention avoid these potential problems by providing a mechanism for more reliably determining if sensed object positions correspond to a single input object or multiple input objects. If it is determined that the sensed object positions correspond to a single input object, the corresponding user interface function can be continued. If instead it is determined that the sensed object positions do not likely correspond to a single input object then this information may be used to select a different user interface function.

The embodiments of the present invention provide this ability using the determined distances between object positions, for example, by comparing the distances between three previous object positions to threshold values. In this implementation, if a first distance between a first object position and a second object position is greater than a first threshold, and a second distance between the second object position and a third object position is less than a second threshold, then it may be more reliably determined that the first and second object positions do not correspond to a single input object.

Figure 5:
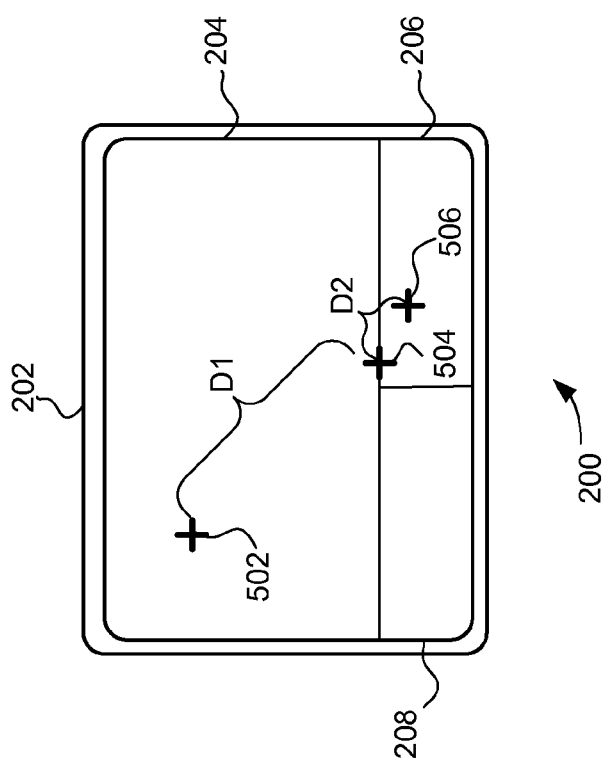

Turning now to FIG. 5, the input device 200 is illustrated with three exemplary object positions 502, 504, and 506 indicated by "+" marks. Object positions 502 and 504 are shown separated by a first distance D1. Likewise, object positions 504 and 506 are shown separated by a second distance D2. In one embodiment, if the first distance D1 is determined to be greater than a first threshold, and the second distance D2 is determined to be less than a second threshold, then it may be more reliably determined that the first and second object positions correspond to different input objects. This determination rests on the principle that it is unlikely that a user can move an object across the sensing region such a relatively large distance in a short amount of time and then immediately stop almost all such movement in a short amount of time. Thus, it is more likely that such a combination of distances between object positions is the result of a first object being removed from the sensing region and a second object being placed on the sensing region in quick succession.

In such an implementation, the thresholds may be preferably selected to reflect the expected behavior of users and the technical capabilities of the proximity sensor device. For example, the first and second threshold may be based on a measured "fastest swipe" which a user could perform. The device may be calibrated individually, providing dynamic thresholds, for specific users to reflect usability behavior. It should be understood that certain specific thresholds will provide more accurate determination of intended user actions.

As was described above, in some implementations the input device may report object positions as absolute positions on the input device. In other implementations the input device may report object positions as relative positions, e.g., as a change in position from a previously reported position. In either case, the distance between object positions may be appropriately determined and used to determine if the object positions correspond to one or more objects. Furthermore, in some systems the input device may report time and speed of object position. In such a system, the distances between object positions may be calculated from the time and/or speed data and then used to determine if the object positions correspond to one or more objects.

In a variation on these embodiments, an additional distance between object positions may also be used to facilitate reliable determination. In particular, the distance between the first object position and a previous object position (referred to herein as a "zeroth" object position) may also be used to more reliably determine if the object positions correspond to a single input object. In this embodiment, if the "zeroth distance" between the "zeroth object position" and the first object position is less than a "zeroth threshold", and the conditions from the previous embodiment are also met, then it is even more likely that the object positions correspond to multiple input objects.

Figure 6:
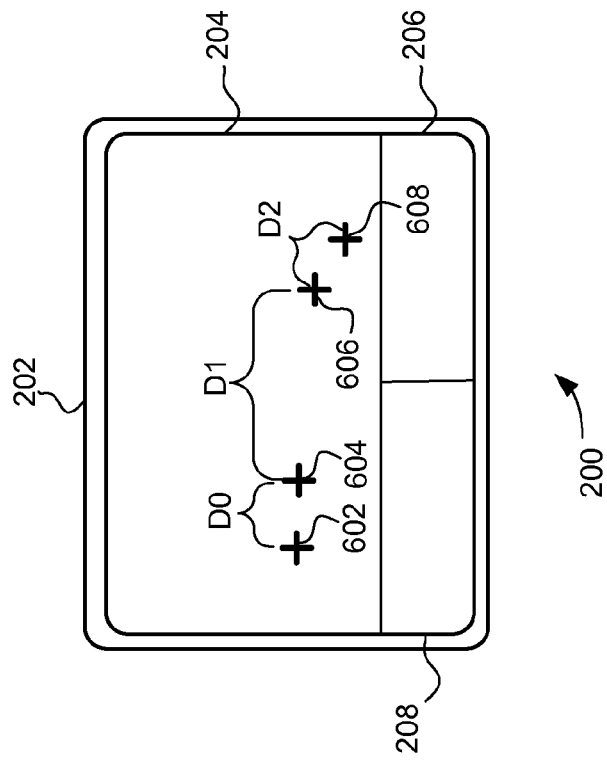
FIGS. 5-7 are top views of exemplary object positions in a sensing region in accordance with embodiments of the invention.

Turning now to FIG. 6, the input device 200 is illustrated with four exemplary object positions 602, 604, 606 and 608 indicated by "+" marks. Object positions 602 and 604 are shown separated by a zeroth distance D0. Likewise, object positions 604 and 606 are shown separated by a first distance D1. Finally, object positions 606 and 608 are shown separated by a second distance D2. In this embodiment, if the zeroth distance D0 is determined to be less than a zeroth threshold, the first distance D1 is determined to be greater than a first threshold, and the second distance D2 is determined to be less than a second threshold, then it may be more reliably determined that the first and second object positions do not correspond to the same input object. Again, this determination rests on the principle that it is unlikely that a user can quickly start moving an object across the sensing region, achieve a relatively high speed, and then immediately stop almost all such movement. Thus, by further utilizing the zeroth distance, this embodiment increases the likelihood of a correct determination. Specifically, it is even more likely that such a combination of distances between object positions is the result of a first object being removed from the sensing region and a second object being placed on the sensing region in quick succession.

In some input devices, the positions of objects in the sensing region are determined at a defined rate, typically referred to as a sampling rate. For example, a typical capacitive input device may have a sampling rate of 80 Hz, and thus have a defined time between samples of $1/80^{th}$ of a second. During each such cycle, new measurements are taken and new object positions calculated. In such a system, the first, second and third object positions will commonly correspond to the three directly successive cycles. Thus, the first object position will be the position measurement made that directly follows the zeroth position and immediately precedes the second position. Of course, it should be noted that in some cases noise and other factors may prevent consecutive measurements from being used.

In a further variation on these embodiments the distances may be determined and compared as component distances along axes that are substantially orthogonal. For example, the first distance may be compared to the first threshold by comparing a first component of the first distance along a first axis to a first component threshold; and/or comparing a second component of the first distance along a second axis to a second component threshold. Likewise, the second distance may be compared to the second threshold by comparing a first component of the second distance along a second axis to a first component threshold; and/or comparing a second component of the second distance along a second axis to a second component threshold. As will be described in greater detail below, an additional variation on this embodiment may be used to identify object positions that are indicative of one finger moving quickly.

Examining distances through individual components of distance also can be used to facilitate distinguishing of objects in situations where the input device incorrectly sees multiple, simultaneously present objects where only one exists. Specifically, when a user lifts an object from one position and almost immediately follows with a second object placed at a second position, the system may sense a "ghost image" at an intermediate position that does not in fact correspond to a true object position. This ghost image may be caused by the near simultaneous presence of the two objects in the sensing region. This problem has been especially acute in embodiments that project the capacitive profile along separate axes rather than forming a discrete image because such sensors become confused regarding the correspondence between sensed axis components of multiple objects (for example, mistakenly determining that the horizontal position of one object corresponds to the vertical position of the other object, which can result in these "ghost" positions). As one example, in a sensor with some electrodes configured to sense in X coordinates and other electrodes configured to sense in Y coordinates, the near simultaneous presence of two objects may been seen generate a ghost image that combines the X coordinate sensed position of one object with the Y coordinate sensed position of the other object. In past systems, such a ghost image may have incorrectly interpreted by the system and result in an unwanted occurrence of an interface action, e.g., unwanted cursor movement.

In one embodiment, the system and method is configured to monitor for the occurrence of a characteristic "L" in object positions that is indicative of such a ghost image, and can thus be used to determine whether object positions correspond to a single input object or multiple input objects. This characteristic L shape in the object positions may be identified using the distances between object positions, specifically by comparing the distances to threshold values which are indicative of the L shape. Some embodiments determine an "L" shape by examining if a first distance (between a first position and a second position) is greater than a first threshold in one of two axis components. Some embodiments determine if a second distance (between the second position and a third position) is greater than a second threshold in the other of the two axis components. Some embodiments examine if a first distance has a first component along a first axis that is greater than a first threshold and a second component along a second axis that is less than a second threshold, and if this first distance is followed by a second distance that has a first component along the first axis that is less than a third threshold and a fourth component along the second axis that is greater than a fourth threshold.

Figure 7:
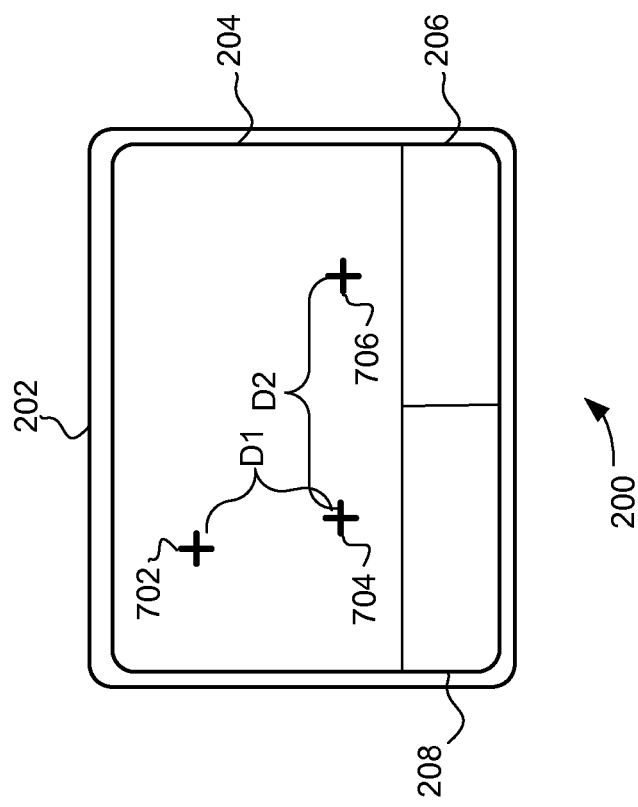

Turning now to FIG. 7, the input device 200 is illustrated with three exemplary object positions (first object position 702, second object position 704, and third object position 706, each indicated by an "+" mark). First and second object positions 702 and 704 are shown separated by a first distance D1 and second and third object positions 704 and 706 are shown separated by a second distance D2. In one embodiment, if the first distance D1 is determined to be greater than a first threshold in a first coordinate, and the second distance D2 is determined to be greater than a second threshold in a second coordinate, then it may be reliably determined that the first and second object positions 702 and 704 do not both correspond to the same input object because the second object position 704 is a "ghost image" generated by the near simultaneous presence of two objects in the sensing region. That is, the second object position 704 does not correspond to any true object positions, and thus does not correspond to any input objects. Assuming that the first and third object positions 702 and 706 are true object positions, and second object position is a "ghost image" it may also be determined that the first and third object positions 702 and 706 correspond to different objects.

Referring still to FIG. 7, in some embodiments, other additional criteria are also used to gauge if object positions comprise an "L," such that the second object position 704 is a "ghost image." For example, some embodiments examine if the first distance D1 has a first component along a first axis that is greater than a first threshold and a second component along a second axis that is less than a second threshold and if the second distance D2 has a first component along the first axis that is less than a third threshold and a fourth component along the second axis that is greater than a fourth threshold. Where the first and second distances D1 and D2 meets these criteria, it may be determined that second object position 704 is a "ghost image" and thus does not correspond to any input objects.

Figure 8:
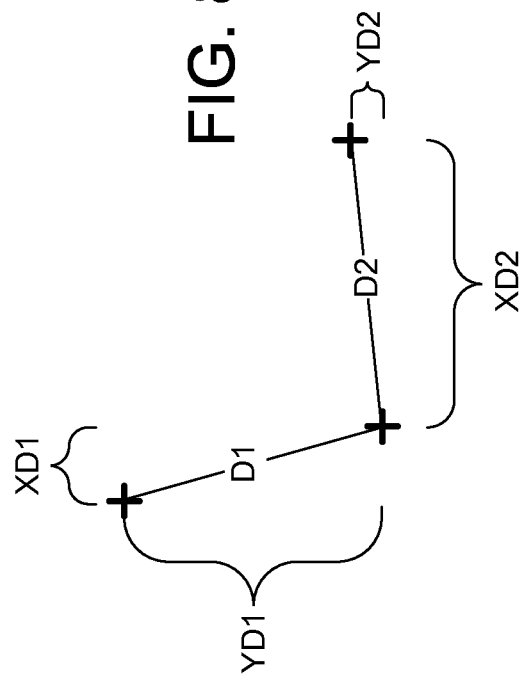
FIG. 8 is a diagram show coordinate distances between object positions in accordance with embodiments of the invention.

Cartesian coordinates may be used, and the comparison of X and Y components of the first distance D1 and second distance D2 is highlighted in FIG. 8. In FIG. 8, the first axis component of the D1 distance is identified as XD1, and second axis component of the D1 distance is identified as YD2. Likewise, the first axis component of the D2 distance is identified as XD2, and the second axis component of the D2 distance is identified as YD2. In this figure, it is illustrated how an object distance with relatively large first or second axis components, followed by an object distance having a relatively large component in the other axis, forms the characteristic L shape in the sensed object positions.

As described above, the characteristic "L" shape (with object positions separated by small component distances in one axis and large component distances in the other axis) is indicative of one object being lifted from the first position and another object being placed at the third position in many profile sensors. Thus, it is more likely that such a combination of distances between object positions is the result of a first object being removed from the sensing region and a second object being placed on the sensing region in quick succession. The input device can thus compare distance components to thresholds described above to identify object positions that correspond to multiple input objects.

Figure 9:
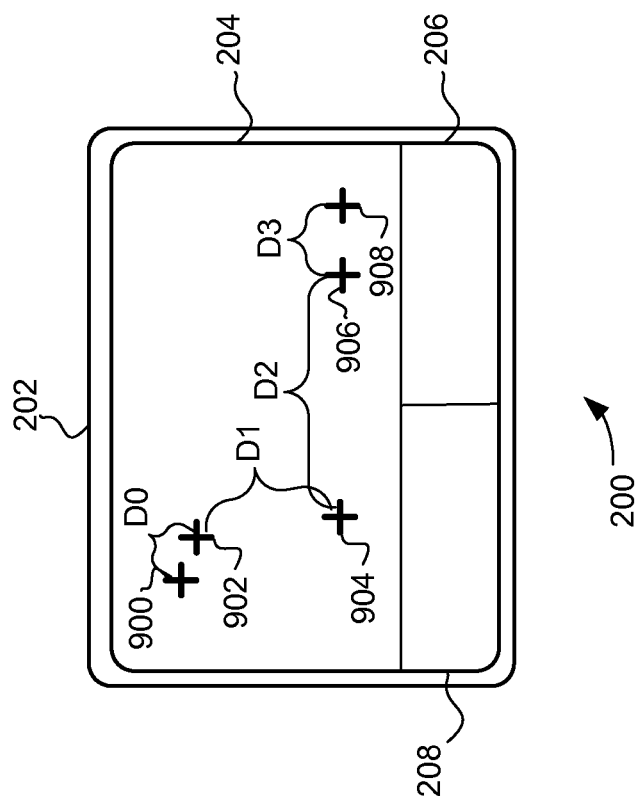
FIG. 9 is a top view of exemplary object positions in a sensing region in accordance with an embodiment of the invention.

It should be noted that in some variations of this embodiment, as shown in FIG. 9, a zeroth distance D0 and/or a third distance D3 may be used to increase the likelihood of a correct determination of input objects. In FIG. 9, the zeroth distance D0 corresponds to the distance between the zeroth position 900 and the first position 902, the first distance D1 corresponds to the distance between the first position 902 and the second position 94, the second distance D2 corresponds to the distance between the second position 904 and the third position 906, and the third distance D3 corresponds to the distance between the third position 906 and the fourth position 908. It is unlikely that a user can start moving an object across the sensing region 202 at a relatively high speed, and then immediately stop almost all such movement. Thus, in some embodiments, the zeroth distance D0 and/or the third distance D3 may be compared to appropriate thresholds. When combined with the comparing of components in the first distance D1 and the second distance D2, such an embodiment may provide more reliable determination of single or multiple input objects.

As was described above, an incorrect determination of single or multiple input objects can result in variety of unwanted results. For example, incorrectly identifying two object positions as resulting from a single input object may result in unwanted and unexpected cursor movement. To avoid this result the above described techniques can determine if object positions correspond to a single input object or multiple input objects. Such a determination may be utilized to avoid negative results in a variety of ways.

For example, the input device may be configured to generate an appropriate control signal that is indicative of a single input object. Likewise, the input device may be configured to generate an appropriate control signal that is indicative of multiple input objects. In either case, the system may respond appropriately to such control signals, such as by reporting one object lifting, another object arriving, virtual button activation, relative object motion, absolute position information, etc. In any such case, the appropriate control signal is generated and the system responds with the correct user interface action based on the most likely intended result.

Likewise, the system may respond by withholding reporting of object position information. For example, in a system where object motion is indicated in the form a change from a previous position (e.g., in a relative position input device), the system may be configured to buffer the reporting of a change in position of an object in response to a determination that the object position in fact corresponds to a different input object that has been placed in the sensing region. In some situations, this reporting of a change in position is delayed until the next object position is calculated and the determination is made with that next object position. Using the example of FIG. 5, if the distances D1 and D2 are indicative of multiple input objects it may be desirable to prevent the reporting of position 504 (either as relative or absolute position data). Instead, such the system would preferably report the activation of the function corresponding to region 206, using for example, the appropriate control signal.

Such a system may require a delay in the reporting of position data such that the next object position may first be obtained and used in the determination of single or multiple input objects. Using the example above, the reporting position 504 would be delayed until after the distance D2 could be determined. Such a delay may be provided by buffering the position information and providing the system with the ability to prevent the previous position, which may be incorrect, from being reported or responded to when the current position provides the proper indications. It should be understood, that in many cases, any delay or buffering of control or position data may be unnoticed by the user.

Thus, in many implementations it maybe desirable to provide the ability to respond with a variety of control signals, buffering, and other reporting in response to a determination that object positions correspond to one or more input objects.

In one particular application of the above techniques, the system and method may be implemented on an input device that is configured to respond to force applied to an input surface contactable by input objects in the sensing region. Sufficient force (such as above a threshold force value or having particular force over time profiles) may be associated with actuation. For example, the input device may respond to sufficient force by simulating the actuation of a switch, and by providing an actuation signal.

In some embodiments, the force applied to the input surface causes the input surface to move, such as by deflection, deformation, translation, and the like. Sufficient force causes motion of input surface to a degree that actuates a physical switch. The switch or some other component may provide tactile feedback indicative of actuation. In some embodiments, the force applied to the input surface causes negligible motion of the input surface, and force sensors detect the amount of force applied. Actuators or other active components may provide tactile feedback indicative of actuation.

In such a case, the virtual button zones, 206 and 208, may emulate the function of conventional physical primary, right, and/or left click buttons, which may or may not be present. Many ways of responding to such applied force may be used by various embodiments, including a physical switch that actuates when the force exceeds its actuation threshold. In such an embodiment, the surface of the sensor may be suspended in a mechanism that equalizes the force sensitivity across the sensing surface, or it may simply be hinged on one edge to allow motion of the surface to actuate a button mounted on the bottom of the other edge. It should be understood that many mechanisms for detecting applied force on a surface are known in the art, many of which are applicable to this invention.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. An input device comprising:
   an array of sensing electrodes configured to sense objects in a sensing region;
   a processing system coupled to the array of sensing electrodes, the processing system configured to:
   operate the array of sensing electrodes to detect positions of objects in the sensing region;
   determine a first distance between a first object position and a second object position;
   determine a second distance between the second object position and a third object position;
   determine a zeroth distance between a zeroth object position and the first object position; and
   determine if the first object position and the second object position both correspond to a single input object from the first distance and the second distance by determining whether the first distance is greater than a first threshold and the second distance is less than a second threshold, wherein the processing system is configured to determine if the first object position and the second object position both correspond to the single input object by additionally determining if the zeroth distance is less than a zeroth threshold.

2. The input device of claim 1 wherein the processing system is further configured to report a motion control signal in response to a determination that the first object position and the second object position both correspond to the single input object, and not to report the motion control signal in response to a determination that the first object position and the second object position do not both correspond to the single input object.

3. The input device of claim 1 wherein the processing system is further configured to:
   buffer a control signal in response to at least one of an acquisition of the second object position and a determination of the first distance;
   report the control signal in response to a determination that the first object position and the second object position both correspond to the single input object; and
   not to report the control signal in response to a determination that the first object position and the second object position do not both correspond to the single input object.

4. The input device of claim 1 further comprising an input surface contactable by input objects in the sensing region, wherein the input surface is further configured to move in response to a force applied to the input surface, and wherein the processing system is further configured to report an actuation signal in response to sufficient motion of the input surface.

5. An input device comprising:
   an array of sensing electrodes configured to sense objects in a sensing region;
   a processing system coupled to the array of sensing electrodes, the processing system configured to:
   operate the array of sensing electrodes to detect positions of objects in the sensing region;
   determine a first distance between a first object position and a second object position;
   determine a second distance between the second object position and a third object position; and
   determine if the first object position and the second object position both correspond to a single input object from the first distance and the second distance by determining whether the first distance is greater than a first threshold and the second distance is less than a second threshold; and
   an input surface contactable by input objects in the sensing region; and
   a display screen having an active area underlying the input surface, the active area viewable through the input surface,
   wherein the processing system is further configured to:
   in response to a determination that the first object position and the second object position do not both correspond to a single input object, provide an indication of a first input object lifting from the input surface.

6. An input device, the input device comprising:
   a plurality of sensor electrodes, the plurality of sensor electrodes configured to capacitively sense objects in a sensing region, the sensing region including a first portion and a second portion, the second portion associated with an interface action; and
   a processing system communicatively coupled to the plurality of sensor electrodes, the processing system configured to:
   operate the array of sensing electrodes to detect positions of objects in the sensing region;
   determine a first distance between a first object position and a second object position, where the second object position directly follows the first object position;
   determine a second distance between the second object position and a third object position, where the third object position directly follows the second object position;
   determine a zeroth distance between a zeroth object position and the first object position;
   determine if the first object position and the second object position correspond to the single input object by determining if the first distance is greater than a first threshold and the second distance is less than a second threshold, wherein the processing system is configured to determine if the first object position and the second object position both correspond to the single input object by additionally determining if the zeroth distance is less than a zeroth threshold;
   indicate the interface action associated with the second portion in response to:
   the first object position being in the first portion, the second object position being in the second portion and a determination that the first object position and the second object position do not both correspond to the single input object;
   indicate cursor movement in response to:
   a determination that the first object position and the second object position both correspond to the single input object.

7. A processing system for an input device configured to sense objects in a sensing region, the processing system comprising:
   a position acquisition module configured to acquire object positions of input objects in the sensing region
   a determiner module configured to:
   determine a first distance between a first object position acquired by the position acquisition module and a second object position acquired by the position acquisition module;
   determine a second distance between the second object position and a third object position acquired by the position acquisition module; and determine if the first object position and the second object position both correspond to a single input object using the first distance and the second distance by determining whether the first distance is greater than a first threshold and the second distance is less than a second threshold, wherein the determiner module is configured to determine if the first object position and the second object position both correspond to the single input object from the first distance and the second distance by:
  determining whether the first distance has a component in a first axis greater than the first threshold;
  determining whether the first distance has a component in a second axis less than the second threshold;
  determining whether the second distance has a component in the second axis greater than a third threshold; and
  determining whether the second distance has a component in the first axis less than a fourth threshold.

8. The processing system of claim 7 wherein the determiner module is further configured to determine a zeroth distance between a zeroth object position and the first object position, wherein the processing system is configured to determine if the first object position and the second object position both correspond to the single input object by additionally determining if the zeroth distance is less than a zeroth threshold, and wherein the second object position directly follows the first object position, the third object position directly follows the second object position, and the first object position directly follows the zeroth object position.

9. The processing system of claim 7, further comprising:
  a reporter module configured to report a control signal in response to a determination that the first object position and the second object position do not both correspond to the single input object.

10. The processing system of claim 7, further comprising:
  a reporter module configured to report a control signal in response to a determination that the first object position and the second object position both correspond to the single input object.

11. The processing system of claim 7 further comprising a reporter module configured to:
  buffer a motion control signal in response to at least one of an acquisition of the second object position and a determination of the first distance;
  report the motion control signal in response to a determination that the first object position and the second object position both correspond to the single input object; and
  not to report the motion control signal in response to a determination that the first object position and the second object position do not both correspond to the single input object.

12. The processing system of claim 7 wherein the determiner module is further configured to:
  determine at least one of a time and a speed associated with at least one of the first, second, and third object positions; and
  use the at least one of the time and the speed in determining if the first object position and the second object position both correspond to the single input object.

13. The processing system of claim 7 wherein the sensing region includes a selection region, and wherein the processing system further comprises:
  a reporter module configured, in response to at least one of the first object position and the second object position being in the selection region to:
    report a first control signal for causing movement in response to a determination that the first object position and the second object position both correspond to the single input object; and
    report a second control signal for causing selection in response to a determination that the first object position and the second object position do not both correspond to the single input object.

14. A method for responding to object positions associated with user inputs in a sensing region of an input device, the method comprising:
  determining a first distance between a first object position and a second object position;
  determining a second distance between the second object position and a third object position;
  determining a zeroth distance between a zeroth object position and the first object position;
  determining if the first object position and the second object position correspond to a single input object using the first distance and the second distance determining if the first distance is greater than a first threshold and the second distance is less than a second threshold, wherein determining if the first object position and the second object position correspond to the single input object further comprises using the zeroth distance; and
  generating a control signal in response to determining that the first object position and the second object position both correspond to the single input object.

15. The method of claim 14 further comprising not generating the control signal in response to a determination that the first object position and the second object position do not both correspond to the single input object.

16. The method of claim 14 wherein the second object position directly follows the first object position and wherein the third object position directly follows the second object position.

17. The method of claim 14, further comprising:
  determining at least one of a time and a speed associated with at least one of the first, second, and third object positions; and
  using the at least one of the time and the speed in the determining if the first object position and the second object position correspond to the single input object.

18. The method of claim 14 further comprising determining a zeroth distance between a zeroth object position and the first object position, and wherein the step of determining if the first object position and the second object position correspond to the single input object further comprises using the zeroth distance.

19. The method of claim 14 wherein the sensing region has a portion associated with a function, and wherein in response to at least one of the first object position and the second object position being in the portion, the step of generating the control signal comprises:
  generating a first control signal for causing movement in response to a determination that the first object position and the second object position both correspond to the single input object; and
  generating a second control signal for causing the function in response to a determination that the first object position and the second object position do not both correspond to the single input object.

* * * * *